United States Patent
Wootton

(10) Patent No.: US 7,000,074 B2
(45) Date of Patent: Feb. 14, 2006

(54) SYSTEM AND METHOD FOR UPDATING A CACHE

(75) Inventor: Steven Marlow Wootton, Springville, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 10/853,250

(22) Filed: May 26, 2004

(65) Prior Publication Data

US 2004/0220924 A1    Nov. 4, 2004

Related U.S. Application Data

(63) Continuation of application No. 10/074,027, filed on Feb. 14, 2002, now Pat. No. 6,792,510.

(51) Int. Cl.
*G06F 12/00*    (2006.01)

(52) U.S. Cl. .................. 711/133; 711/154; 711/159; 711/167; 709/216

(58) Field of Classification Search ............. 711/133, 711/154, 159, 167; 709/216, 201, 203; 707/205, 707/206
See application file for complete search history.

(56) References Cited

U.S. PATENT DOCUMENTS

| | | | | |
|---|---|---|---|---|
| 3,703,727 A | * | 11/1972 | Knowlton | 711/217 |
| 5,692,129 A | | 11/1997 | Sonderegger et al. | 707/103 R |
| 6,018,793 A | * | 1/2000 | Rao | 711/150 |
| 6,029,175 A | | 2/2000 | Chow et al. | 707/104.1 |
| 6,128,701 A | | 10/2000 | Malcolm et al. | 711/133 |
| 6,209,003 B1 | | 3/2001 | Mattis et al. | 707/206 |

FOREIGN PATENT DOCUMENTS

WO    WO 00/19648    4/2000

* cited by examiner

*Primary Examiner*—Brian R. Peugh
(74) *Attorney, Agent, or Firm*—Pillsbury Winthrop Shaw Pittman LLP

(57) ABSTRACT

A system and method designed to reduce network congestion. In one aspect, a system according to the invention includes a server and two or more clients. Each client has software that runs on the client. The software requires data that is stored at the server. Advantageously, the software maintains a cache for storing the required data after the data is retrieved by the software from the server. Once the required data is in a cache, the software need not retrieve the required data from the server; the software can retrieve the required data from the software's cache. To ensure that the data that is stored in the cache does not become stale and to avoid network overload, the software updates its cache at a random point in time.

19 Claims, 4 Drawing Sheets

SYSTEM AND METHOD FOR UPDATING A CACHE

CROSS REFERENCE TO RELATED APPLICATIONS

This application is a continuation of U.S. application Ser. No. 10/074,027, filed Feb. 14, 2002 now U.S. Pat. No. 6,792,510, and titled "System and Method Updating a Cache."

BACKGROUND OF THE INVENTION

1. Field of the Invention

The present invention is generally related to the field of caching, and, more specifically, to systems and methods for updating a cache.

2. Discussion of the Background

A cache is a data storage medium that is used by software (e.g., a computer program) to store recently accessed data that was retrieved from a relatively slower storage medium. The purpose of a cache is to speed up subsequent access to the data. A cache is most often applied to processor-memory access but is also used for storing locally a copy of data accessible over a network.

For example, in a client-server environment where data is centrally stored and managed on a central server (i.e., main storage unit) and software requiring that data runs on a client, a cache for storing the data is created on the client so that the software need not always request the data from the server: the software can request the data from the cache. By having the ability to retrieve the data from the cache as opposed to retrieving it from the server, the software is able to more quickly access the data.

However, in order for the software to function properly, the cache must be periodically updated to ensure that the cache stores the most up to date data. That is, for example, it is desirable to avoid the situation where the cache stores a much earlier version of a file than is stored in the main storage unit.

In the client server environment where there are many clients and each client has its own cache, a network overload problem can occur if several or more of the caches are updated at about the same time. This situation typically occurs when the software that updates the cache is programmed to do so shortly after the software is launched.

SUMMARY OF THE INVENTION

The invention aims to overcome the above identified network congestion problem.

In one aspect, the invention provides a method that includes the acts of storing data in a cache, retrieving data from the cache, generating a random number, and updating the cache after an amount of time has elapsed, wherein the amount of time is a function of the generated random number. With this method, caches will be updated at a random point in time, thereby making it unlikely that several caches will be updated at the same time.

In another aspect, the invention provides a system that includes a server and two or more clients. Each client has software (also referred to as "a program") that runs on the client, and, in one embodiment, the programs are launched substantially simultaneously. The programs require data that is stored at the server. Advantageously, each program maintains a cache for storing the required data after the data is retrieved by the program from the server. Once the required data is in the caches, the programs need not retrieve the required data from the server; the programs can retrieve the required data from the program's cache. To ensure that the data that is stored in the cache does not become stale and to avoid network overload, each program updates its cache at a random point in time.

In another aspect, the invention provides a computer program product for updating a cache. The computer program product is embodied in a computer readable medium and includes computer instructions for: determining whether the cache should be updated immediately; retrieving data from a main storage unit and storing the retrieved data in the cache if it is determined that the cache should be updated immediately; and generating a random number and updating the cache after an amount of time has elapsed, wherein the amount of time is a function of the generated random number, if it is determined that the cache should not be updated immediately.

In another aspect, the invention provides a method for launching applications for a user of a workstation. This method includes the act of: determining a user identifier that identifies the user; transmitting to a database server the user identifier, wherein the database server retrieves from a database application data that is associated with an application that is associated with the user identifier; receiving from the database server the application data; storing the application data in a cache stored on a storage medium to which the workstation has direct access; generating a random number; and updating the cache after an amount of time has elapsed, wherein the amount of time is a function of the generated random number.

The above and other features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
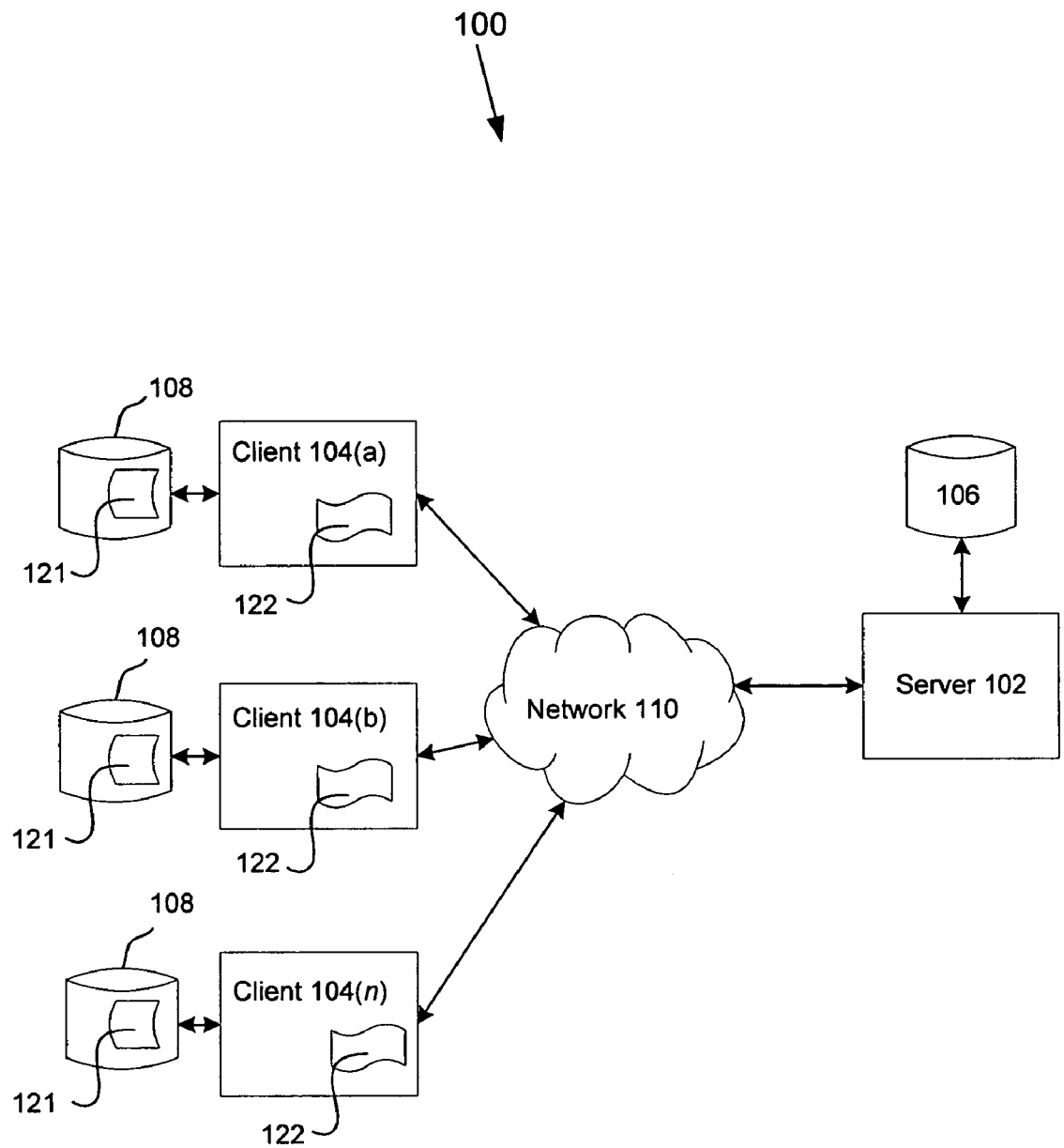
FIG. 1 is a functional block diagram of a system according to one embodiment of the present invention.

FIG. 1 is a block diagram of a system 100 according to one embodiment of the present invention. System 100 includes at least one server 102, one or more clients 104(a) . . . (n), and a network 110 for enabling the clients 104 to send data to and receive data from server 102. Server 102 has access to a main storage unit 106 for storing data. Each client 104 has access to a local storage unit 108 for storing data. Each client also includes a processing unit and software 122 (or program 122) that runs on processing unit and that functions to update a cache 121 stored on storage unit 108. In one embodiment, programs 122 are launched substantially simultaneously.

Figure 2:
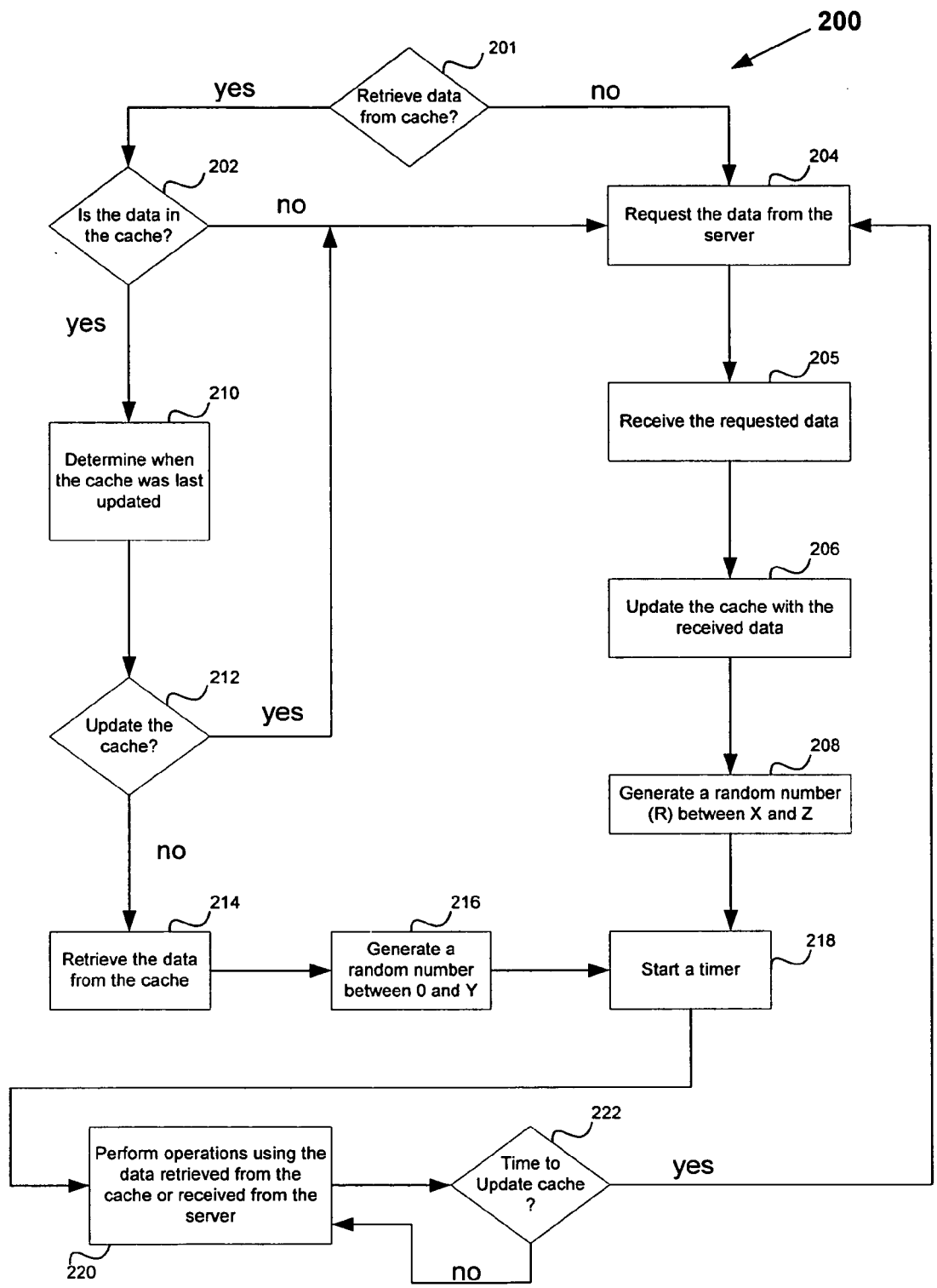
FIG. 2 is a flow chart illustrating a process, according to one embodiment, for updating a cache.

To avoid network congestion problems that might occur if all of the programs 122 attempted to update their respective caches 121 at the same time, each program performs the following process 200 (see FIG. 2). Process 200 is performed each time a program 122 is launched.

Process 200 begins in step 201, where a program 122 checks a configuration parameter to determine whether it should attempt to retrieve from its cache 121 data that program 122 requires. If the configuration parameter indicates that program 122 should attempt to retrieve required data from cache 121, process 200 proceeds to step 202, otherwise process 200 proceeds to step 204.

In step 202, program 122 determines whether its cache 121 contains data that program 122 requires. For example, program 122 may need to access a particular configuration file in order for program 122 to provide the functionality that program 122 was designed to provide. So, in step 202, program 122 checks to see whether the required file is stored in cache 121. If cache 121 contains data that program 122 requires, then process 200 proceeds to step 210, otherwise process 200 proceeds to step 204.

In step 204, program 122 requests the required data from a server, such as server 102, which stores the data on main storage unit 108. In step 205, program 122 receives the required data from server 102. In step 206, program 122 updates its cache 121 with the received data. For example, if program 122 receives from server 102 a file having a particular name, and cache 121 stores a file having the same particular name, then program 122 will replace the file stored in cache 121 with the file received from server 102, thereby updating cache 121. In step 208, program 122 generates a random number (R) between X and Z, where X and Z are values that can be set by an administrator or determined programmatically. After step 208, process 200 proceeds to step 218.

In step 210, program 122 determines when cache 121 was last updated. In step 212, program 122 determines whether cache 121 needs updating based on when cache 121 was last updated. For example, program 122 may be configured to update cache 121 if program 122 determines that cache has not been updated within the last X number of days, where X can be configurable. If in step 212 program 122 determines that cache 121 needs updating, then control passes back to step 204, otherwise process 200 proceeds to step 214.

In step 214, program 122 retrieves the required data from cache 121. In step 216, program 122 generates a random number (R) between 0 and Y, where Y can be set by an administrator or determined programmatically. In step 218, program 122 starts a timer. In step 220, program 122 performs operations on and/or uses the data retrieved from cache 121 or received from server 102 (e.g., program 122 may display to a user at least some of the data retrieved from cache 121 or received from server 102). In step 222, program 122 checks the timer to determine whether an amount of time that is a function of R has elapsed. For example, the amount of time can be R seconds, minutes, days, etc. If in step 222 it is determined the amount of time has elapsed, control passes back to step 204, otherwise control passes back to step 220.

Because in the process described above each program 122 updates its respective cache at a randomly determined time, process 200 provides a method for avoiding the network congestion that occurs when several programs 122 attempt to update their caches 121 at about the same time.

In one aspect, a cache update method according to the present invention may be used by an application launcher, which is a software application that is installed on a user's workstation (e.g., a client 104). An application launcher displays application object icons on the user's workstation and performs various application management functions, such as distributing (installing) applications, uninstalling applications, and caching applications.

Figure 3:
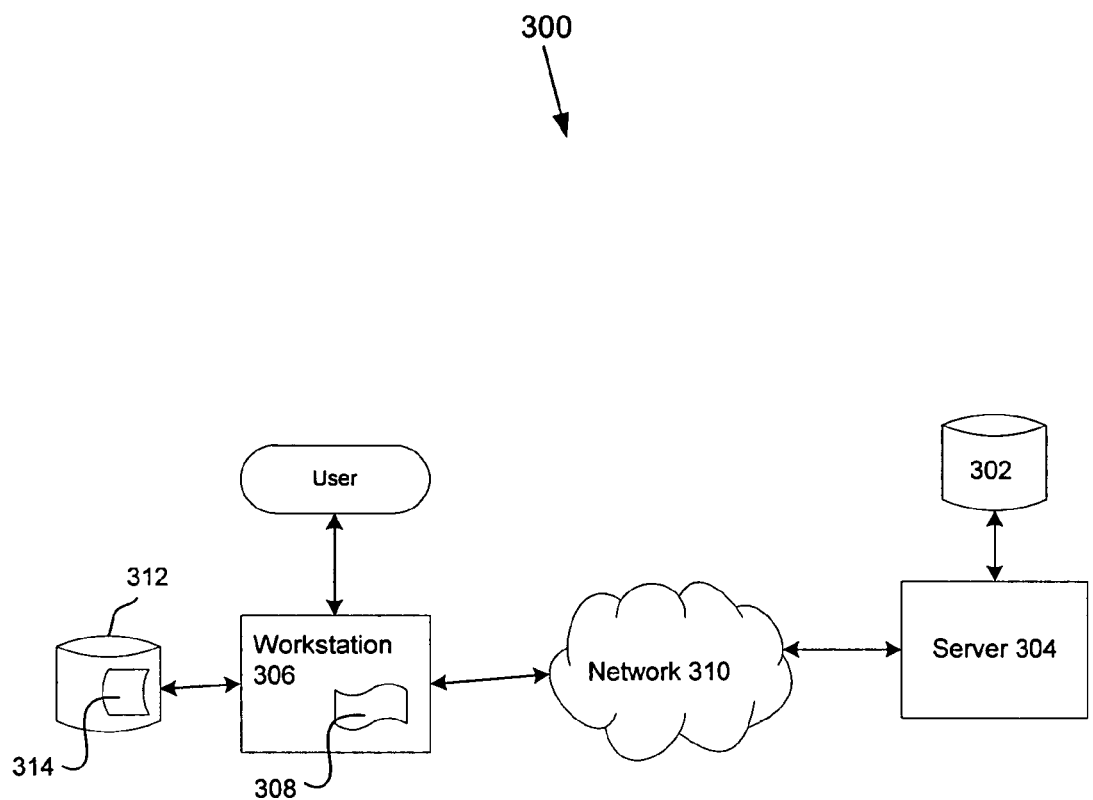
FIG. 3 is a functional block diagram of an application launching system according to one embodiment of the present invention.

FIG. 3 is functional block diagram showing components of an application launching system 300. As shown in FIG. 3, application launching system 300 includes a master application database 302 for associating applications with a user and/or a workstation (i.e., a user 301 and/or a workstation 306 is associated with zero or more applications) and for storing application data; a database server 304 that has access to database 302; a workstation 306; and a network 310 for enabling workstation 306 to communicate with server 304. Workstation 306 has installed therein an application launcher 308. Additionally, workstation 306 has direct access to a storage medium 312 for implementing a cache 314. Cache 314 is used to by application launcher 308 to cache data that is stored in master application database 302.

Figure 4:
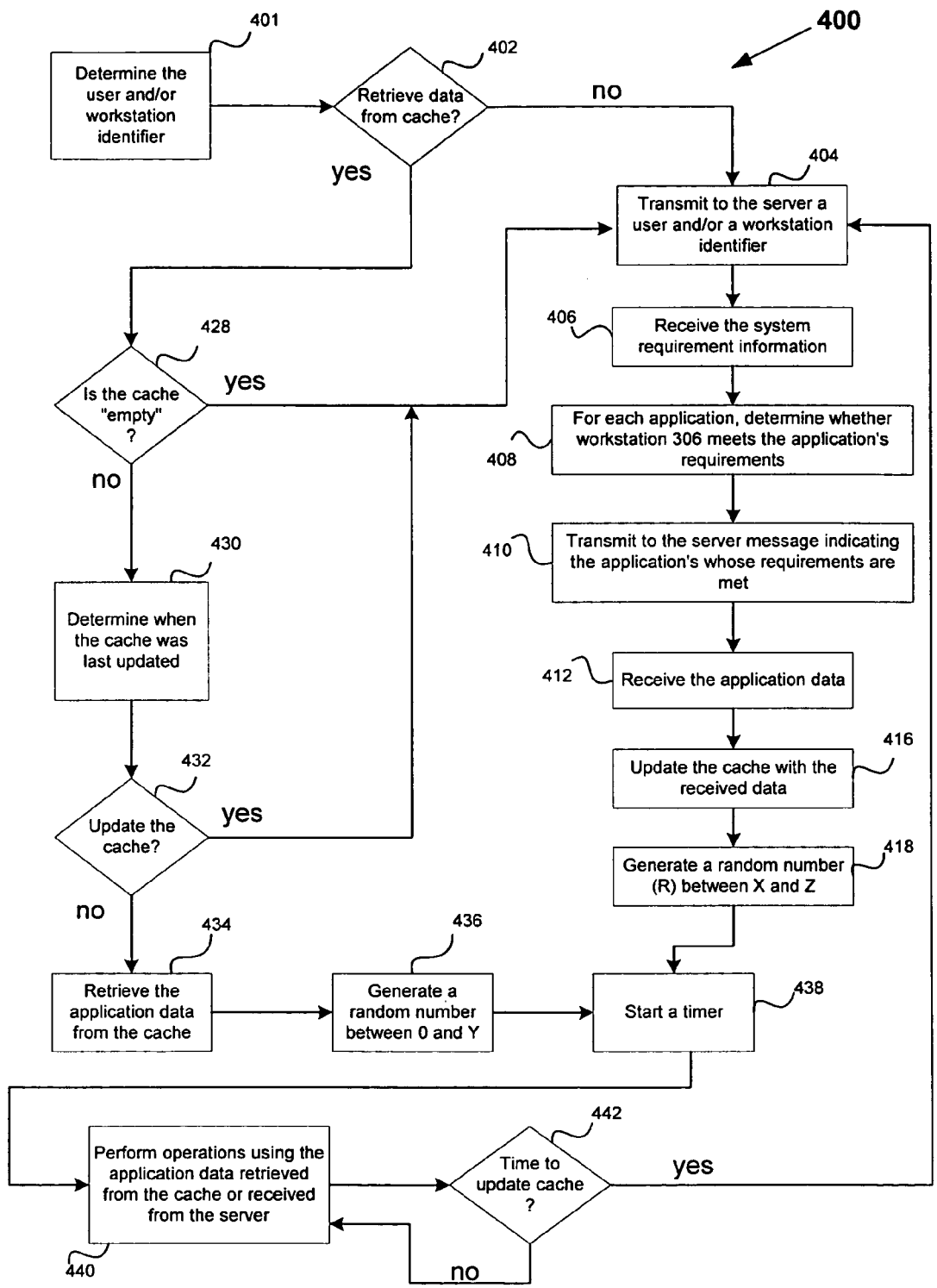
FIG. 4 is a flow chart illustrating a process, according to one embodiment, that can be performed by an application launcher.

FIG. 4, is a flow chart illustrating a process 400 performed by application launcher 308 according to one embodiment. Process 400 begins in step 401, where application launcher 308 determines user 301's identifier (e.g., username) and/or workstation 306's identifier. In step 402, application launcher checks a configuration parameter to determine whether to bypass a random cache update feature. In one embodiment, the configuration parameter is stored in database 302, but the parameter could also be stored in a local configuration file stored on storage medium 312. If the configuration parameter indicates that application launcher 308 should bypass the random cache update feature, process 400 proceeds to step 404, otherwise process 400 proceeds to step 428.

In step 404, application launcher 308 transmits to server 304 a user and/or workstation identifier that identifies user 301 and workstation 306, respectively, and requests server 304 to respond with a list of the applications that are associated with the user and/or workstation identifier. Upon receiving the request from application launcher 308, server 304 access database 302 to determine the applications that are associated with the user and/or workstation identifier and transmits to application launcher 308 system requirement information for each of the determined applications. In step 406, application launcher 308 receives the system requirement information. In step 408, for each application, application launcher 308 examines the application's system requirement information to determine whether workstation 306 meets the application's system requirements. After step 408, control passes to step 410.

In step 410, application launcher 308 transmits to server 304 a message that includes the identifier of each application whose requirements are met by workstation 306. After receiving the message, server 304 retrieves from database 302 application data for each of the identified applications and transmits the retrieved application data to application launcher 308. The application data for an application may include some or all of the following: a title for the application, an icon for the application, and other application related data. In step 412, application launcher 308 receives the application data transmitted from server 304. In step 416, application launcher 308 updates its cache 314 with the received application data. In step 418, application launcher 308 generates a random number (R) between X and Z, where X and Z can be set by an administrator or determined programmatically. After step 418, control passes to step 438.

In step 428, application launcher 308 determines whether cache 314 is "empty." That is, application launcher 308 determines whether cache 314 stores application data that is associated with one or more applications that are associated with user 301 and/or workstation 306. If cache 314 contains no such application data (i.e., cache 314 is empty), then control passes to step 430, otherwise control passes back to step 404.

In step 430, application launcher 308 determines when cache 314 was last updated. In step 432, application launcher 308 determines whether cache 314 needs updating based on when cache 314 was last updated. For example, application launcher 308 may be configured to update cache 314 if application launcher 308 determines that cache has not been updated within the last X days, where X can be configurable. If in step 432 application launcher 308 determines that cache 314 needs updating, then control passes back to step 404, otherwise process 400 proceeds to step 434.

In step 434, application launcher 308 retrieves from cache 314 the application data that is associated with the applications that are associated with user 301 and/or workstation 306. In step 436, application launcher 308 generates a random number (R) between 0 and Y, where Y can be set by an administrator or determined programmatically. In step 438, application launcher 308 starts a timer. In step 440, application launcher 308 performs operations on and/or uses the application data retrieved from cache 314 or received from server 304 (e.g., application launcher 308 may display to a user at least some of the data retrieved from cache 314 or received from server 304). In step 442, application launcher 308 checks the timer to determine whether an amount of time that is a function of R has elapsed. For example, the amount of time can be R seconds, minutes, days, etc. If in step 442 it is determined the amount of time has elapsed, control passes back to step 404, otherwise control passes back to step 440.

While the processes illustrated herein may be described as a series of consecutive steps, none of these processes are limited to any particular order of the described steps. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. A method for launching applications on a workstation, the method comprising:
   determining an identifier associated with a policy;
   retrieving application information associated with the identifier, wherein the application information is retrieved from a cache;
   launching the applications on the workstation using the retrieved application information;
   generating a random number; and
   updating the cache after an amount of time associated with the random number has elapsed, wherein the cache is updated based on the policy with updated application information from a server.

2. The method of claim 1 wherein the identifier comprises at least one of a user identifier and a workstation identifier, and the policy comprises at least one of a user policy associated with the user identifier and a workstation policy associated with the workstation identifier.

3. The method of claim 1 wherein the identifier comprises a workstation identifier and the policy comprises a workstation policy configured according to at least one system capability.

4. The method of claim 3 further comprising, prior to updating the cache, verifying that at least one system requirement associated with the updated application information is met by the at least one system capability.

5. A storage medium for storing a machine readable code, the machine readable code being executable to launch applications on a workstation according to the steps of:
   determining an identifier associated with a policy;
   retrieving application information associated with the identifier from a cache;
   launching the applications on the workstation using the retrieved application information;
   generating a random number; and
   updating the cache after an amount of time associated with the random number has elapsed, wherein the cache is updated with updated application information associated with the policy.

6. The storage medium of claim 5 wherein the identifier comprises at least one of a user identifier and a workstation identifier, and the policy comprises at least one of a user policy associated with the user identifier and a workstation policy associated with the workstation identifier.

7. The storage medium of claim 6 wherein the applications are associated with at least one of the user policy and the workstation policy.

8. The storage medium of claim 5 wherein the identifier comprises a workstation identifier and the policy comprises a workstation policy associated with the workstation identifier configured according to at least one system capability.

9. The storage medium of claim 8, the machine readable code further being executable according to additional step of, prior to updating the cache, verifying that at least one system requirement associated with the updated application information is met by the at least one system capability.

10. A method for updating a cache associated with a user on a workstation, the method comprising:
    determining an identifier associated with a policy;
    generating a random number; and
    updating the cache after an amount of time associated with the random number has elapsed, wherein the cache is updated with information associated with the policy.

11. The method of claim 10 wherein the identifier comprises at least one of a user identifier and a workstation identifier, and the policy comprises at least one of a user policy associated with the user identifier and a workstation policy associated with the workstation identifier.

12. The method of claim 11 wherein the information is application information related to an application associated with at least one of the user policy and the workstation policy.

13. The method of claim 10 wherein the identifier comprises a workstation identifier and the policy comprises a workstation policy associated with the workstation identifier configured according to at least one system capability.

14. The method of claim 13 further comprising, prior to updating the cache, verifying that at least one system requirement associated with the information is met by the at least one system capability.

15. A storage medium for storing a machine readable code, the machine readable code being executable to update a cache associated with a user on a workstation according to the steps of:
   determining an identifier associated with a policy;
   generating a random number; and
   updating the cache after an amount of time associated with the random number has elapsed, wherein the cache is updated with information associated with the policy.

16. The storage medium of claim 15 wherein the identifier comprises at least one of a user identifier and a workstation identifier, and the policy comprises at least one of a user policy associated with the user identifier and a workstation policy associated with the workstation identifier.

17. The storage medium of claim 16 wherein the information is application information related to an application associated with at least one of the user policy and the workstation policy.

18. The storage medium of claim 15 wherein the identifier comprises a workstation identifier and the policy comprises a workstation policy associated with the workstation identifier configured according to at least one system capability.

19. The storage medium of claim 18, the machine readable code further being executable according to additional step of, prior to updating the cache, verifying that at least one system requirement associated with the information is met by the at least one system capability.

* * * * *